United States Patent
Arakawa (10) Patent No.: US 8,402,256 B2
(45) Date of Patent: Mar. 19, 2013

(54) PROCESSING PREFIX CODE IN INSTRUCTION QUEUE STORING FETCHED SETS OF PLURAL INSTRUCTIONS IN SUPERSCALAR PROCESSOR

(75) Inventor: Fumio Arakawa, Kodaira (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 721 days.

(21) Appl. No.: 12/546,809

(22) Filed: Aug. 25, 2009

(65) Prior Publication Data
US 2010/0064119 A1 Mar. 11, 2010

(30) Foreign Application Priority Data
Sep. 9, 2008 (JP) ................................ 2008-231148

(51) Int. Cl.
*G06F 9/38* (2006.01)
(52) U.S. Cl. ........................... 712/226; 712/23; 712/215
(58) Field of Classification Search .......................... None
See application file for complete search history.

(56) References Cited

U.S. PATENT DOCUMENTS

| | | | | |
|---|---|---|---|---|
| 5,586,277 | A * | 12/1996 | Brown et al. ................. | 712/210 |
| 2004/0039897 | A1 | 2/2004 | Kudo | |
| 2010/0299500 | A1* | 11/2010 | McDonald et al. ........... | 712/208 |

FOREIGN PATENT DOCUMENTS

| JP | 2000-284962 A | 10/2000 |
|---|---|---|
| JP | 2004-030015 A | 1/2004 |

OTHER PUBLICATIONS

Markus Levy, "ARM Grows More Thumbs: ARM Announces V6 and 32-Bit Thumb Extensions at EPF", Microprocessor Report, Jun. 17, 2003—02, pp. 1-4, Jun. 2003.
SH-4A software manual, Internet URL http://documentation.renesas.com/jpn/products/mpumcu/rjj09b0090_sh4a.pdf, p. 3-9 to p. 3-19, Tables 3.4, 3.5, 3.6, 3.9, 3.10, and 3.13 (SH-4A Software Manual, Internet URL http://documentation.renesas.com/eng/products/mpumcu/rej09b0003_sh4a.pdf, pp. 33-42, Tables 3.4, 3.5, 3.6, 3.9, 3.10, and 3.13), Oct. 29, 2004.

* cited by examiner

*Primary Examiner* — Kenneth Kim
(74) *Attorney, Agent, or Firm* — Miles and Stockbridge P.C.

(57) ABSTRACT

The present invention is directed to realize efficient issue of a superscalar instruction in an instruction set including an instruction with a prefix. A circuit is employed which retrieves an instruction of each instruction code type other than a prefix on the basis of a determination result of decoders for determining an instruction code type, adds the immediately preceding instruction to the retrieved instruction, and outputs the resultant to instruction executing means. When an instruction of a target instruction code type is detected in a plurality of instruction units to be searched, the circuit outputs the detected instruction code and the immediately preceding instruction other than the target instruction code type as prefix code candidates. When an instruction of a target instruction code type cannot be detected at the rear end of the instruction units to be searched, the circuit outputs the instruction at the rear end as a prefix code candidate. When an instruction of a target instruction code type is detected at the head in the instruction code search, the circuit outputs the instruction code at the head.

4 Claims, 3 Drawing Sheets

(1) `|0|0|0| OP | Rn | LIT4 |`  R0CHG Rn #LIT4
(2) `|0|0|0| OP |   LIT8    |`  R0CHG #LIT8
(3) `|0|0|0| OP | Rm | Rd   |`  R0RDCHG Rm, Rd
(4) `|0|0|0| OP | SZ | LIT6 |`  SZCHG.BU/B/W/D #LIT6
(5) `|0|0|0| OP |   LIT8    |`  LITEXT #LIT8

Fig.8

(6) `|1| OP | Rm | OP | DISP4 |`  MOV.B/W/D @(Rm, disp4), R0
(7) `|1| OP | Rm | OP | DISP4 |`  MOV.B/W/D R0, @(Rm, disp4)
(8) `|1|      OP       |  Rn  |`  DIV.L R0, Rn
(9) `|1| OP | Rm | Rn | DISP4 |`  MOV.L @(Rm, disp4), Rn

PROCESSING PREFIX CODE IN INSTRUCTION QUEUE STORING FETCHED SETS OF PLURAL INSTRUCTIONS IN SUPERSCALAR PROCESSOR

CLAIM OF PRIORITY

The present application claims priority from Japanese application JP 2008-231148 filed on Sep. 9, 2008, the content of which is hereby incorporated by reference into this application.

FIELD OF THE INVENTION

The present invention relates to a data processor such as a microprocessor or a microcomputer and relates to a technique enabling improvement in performance and reduction in power consumption by reducing data transfer frequency.

BACKGROUND OF THE INVENTION

Processors of today are broadly divided into a processor for a PC/server placing the top priority on performance and an embedded processor requested to satisfy both high efficiency and high performance. As an embedded processor requested for high efficiency, an embedded processor of an RISC (Reduced Instruction Set Computer) type using a 16-bit fixed-length instruction set capable of realizing high code efficiency is widespread. The high code efficiency is indispensable for effective utilization of an on-chip cache, a RAM, and a ROM even at present when the capacity of an off-chip memory is large. With the 16-bit fixed-length instruction set, although the program size can be decreased, the number of instructions increases. In particular, due to constraints on operand assignment, the number of instructions in transfer between registers and immediate value transfer instructions increases. Source forwarding is also generally used which forwards a value of a transfer-source register in place of that of a transfer-destination register in order to hide latency of increased transfer instructions. Increase in the number of instructions may cause deterioration in performance and increase in power. The source forwarding that compensates deterioration in performance is one of causes decrease in operation frequency and increase in power due to increase in a critical path and a logic scale.

Such a problem is caused by the fact that the instruction code space of the 16-bit fixed-length instruction set is $2^{16}$ B=64 kB which is much smaller than the instruction code space of $2^{32}$ B=4 GB of a 32-bit fixed-length instruction set. Consequently, for example, in an ARM Thumb-2 instruction set of non-patent document 1, the instruction code space is extended by mixing 16-bit fixed-length instructions and 32-bit fixed-length instructions. On the other hand, in the processor of the patent document 1, by adding 16-bit prefixes to the 16-bit fixed-length instruction set, the instruction code space is extended. The prefix denotes an instruction code having the function of changing the meaning of a subsequent instruction code or adding information to a subsequent instruction code. A prefix itself does not become an instruction. The prefix was used by the i386 processor of Intel Corp. announced in 1985 when the 16-bit architecture was changed to the 32-bit architecture while maintaining upward compatibility and has been known for 20 years or more. In the i386 processor, a prefix is used to change the meaning of the operand size of a subsequent instruction code. Since all of the i386 processor and subsequent machines are processors of the CISC (Complicated Instruction Set Computer) type using a variable length instruction set, an instruction decoding circuit is originally complicated, so that it can be said that the influence on a realization circuit accompanying addition of a prefix is relatively small.

The prefixes in the patent document 1 are used to make a 3-operand instruction by adding an operand to a 2-operand instruction, to add an index to a register indirect addressing instruction to obtain a register relative indirect addressing instruction, and to change a source operand of a 2-operand modify-type instruction to a 3-operand instruction. The patent document 1 discloses a realization method using, as an example, a scalar processor for decoding an instruction code by 16 bits. Since a prefix is also one instruction code, it takes two cycles to decode an instruction with a prefix, and also takes two cycles for execution.

Patent document 2 discloses a processor obtained by improving the processor of the patent document 1. The disclosed functions of a prefix are a change of a destination operand of a 2-operand modify-type instruction to a 3-operand type and extension of bit width of a literal operand. By simultaneously performing decoding of a prefix and a preceding instruction in the decoding of an instruction with a prefix which takes two cycles in the patent document 1, the cycle of decoding the prefix is hidden to thereby realize one cycle execution of the instruction with the prefix.

One of methods of handling the problem such that a resister assignment field cannot be assured in a 16-bit fixed-length instruction set is implicit fixed register assignment. In SH-4A described in non-patent document 2, an instruction using R0 as one of 16 general registers as an implicit fixed register is defined. By utilizing such an instruction by preferentially allocating R0 to an implicit fixed register using instruction at the time of register allocation of a compiler, a demerit of a fixed register is lessened. However, decrease in flexibility of register allocation by fixed operand assignment cannot be always sufficiently hidden. In particular, a provider of a compiler for a plurality of processors for dealing various instruction set architectures by the same compile method has strong tendency of not using an advantage of a specific architecture. Consequently, there is a case that utilization of a fixed register using instruction is insufficient. That is, it cannot be said that a fixed register using instruction is a sufficient countermeasure against the problem such that a register assignment field cannot be assured, and further improvement is necessary.

Non-patent document 1: Markus Levy, "ARM Grows More Thumbs," Microprocessor Report, Jun. 17, 2003-02, June 2003

Non-patent document 2: SH-4A software manual, Internet URL http://documentation.renesas.com/jpn/products/mpumcu/rjj09b 0090_sh4a.pdf, p. 3-9 to p. 3-19, Tables 3.4, 3.5, 3.6, 3.9, 3.10, and 3.13 (SH-4A Software Manual, Internet URL http://documentation.renesas.com/eng/products/mpumcu/rej09b 0003_sh4a.pdf, pp. 33-42, Tables 3.4, 3.5, 3.6, 3.9, 3.10, and 3.13)

Patent document 1: Japanese Unexamined Patent Publication No. 2000-284962

Patent document 2: Japanese Unexamined Patent Publication No. 2004-030015

SUMMARY OF THE INVENTION

As described above, as the instruction code space extending methods for compensating smallness of the instruction code space of the 16-bit fixed-length instruction code, the method of extending the instruction code space by mixing 16-bit fixed-length instructions and 32-bit fixed-length instructions, and the method of extending the instruction code space by adding 16-bit prefixes to a 16-bit fixed-length instruction set are disclosed. In the latter method, concretely, it is disclosed that a 3-operand instruction is made by adding an operand to a 2-operand instruction, an index is added to a register indirect addressing instruction to obtain a register relative indirect addressing instruction, a source or destination operand of a 2-operand modify-type instruction is changed to make a 3-operand instruction, and the bit width of a literal operand is extended. As a method of assuring the number of operands without extending the instruction code space, there is an implicit fixed operand assignment method.

A first object to be achieved by the present invention is to realize improvement in performance and reduction in power by extending the instruction code space while utilizing the advantage of the fixed register using instruction that the number of operands can be assured without extending the space code space and by reducing the transfer instruction appearance frequency even in the case which cannot be dealt by the fixed register using instruction.

When the first object is achieved and the instruction code space is extended, the realization method becomes an issue. In the examples of the patent documents 1 and 2 in the background art, a prefix is defined to extend an instruction code space, and means for realizing it is also disclosed. However, the realization method is based on a scalar processor which issues an instruction one by one and is not adapted to a superscalar architecture capable of simultaneously issuing a plurality of instructions.

A second object to be achieved by the present invention is to enable efficient superscalar instruction issue in an instruction set including an instruction with a prefix. In particular, an instruction with a prefix is issued at efficiency equivalent to that of issue of an instruction without a prefix.

The above and other objects and novel features of the present invention will become apparent from the description of the specification and the appended drawings.

Outline of representative ones of inventions disclosed in the application will be briefly described as follows.

To achieve the first object, in the present invention, a fixed register using instruction is defined and the following function conversion or function extension is performed with a prefix code. The prefix code has the function of replacing a fixed register of the fixed register using instruction to another register or an immediate value. Another second prefix code has the function of assuring orthogonality of instruction definition by compressing the size of an instruction code space by using a fixed register using instruction for an instruction of a size of low use frequency and by using an instruction of designating a register in a register field for an instruction of a size of high use frequency without maintaining orthogonality of the size in the definition of the fixed register using instruction, and changing the size of an instruction of high use frequency to the size of low use frequency by a prefix. Further, since the width of an operand field necessary for size change is small, other functions such as signed/unsigned data extension and extension of bit width of an immediate value or displacement are added to a single prefix code of the size change function, and the instruction definition extension function with a prefix code is enhanced. A prefix code according to further another aspect is positioned as additional information of a subsequent instruction, thereby changing the meaning of the same prefix code in accordance with the type of the subsequent instruction.

With the means, for example, as a register relative indirect load instruction, an instruction having a 32-bit size of high use frequency is defined as an instruction of assigning both of a base address register and a load data storage register in a register field. An instruction having an 8-, 16-, or 64-bit size of low use frequency is defined as an instruction using a load data register as a fixed register. When a prefix of an 8-bit operand field is added to an instruction having a 32-bit size, the prefix uses two bits for size assignment and uses the remaining six bits to extend displacement of register relative indirect addressing. As a result, a transfer instruction from a fixed register to an arbitrary register which is necessary mainly in the case where the prefix is not used becomes unnecessary, and the transfer instruction appearance frequency is lowered. By extending the displacement, an address which was not reached from the base address in the case where the prefix is not used is reached. The case of using two instructions of an immediate value transfer instruction for displacement setting and an index relative load instruction in order to handle the case where the address is not reached is reduced, and the transfer instruction appearance frequency is lowered.

To achieve the second object, the invention employs a decoder for determining an instruction code type after prefetch of an instruction, and a dispatch circuit for retrieving an instruction code of each instruction code type excluding a prefix code on the basis of the determination result, adding an immediately preceding instruction code to the instruction code detected by a search, and dispatching the resultant to instruction executing means of each instruction code type. When an instruction code of a target instruction code type is detected in a plurality of instruction code units to be searched, the dispatch circuit outputs the detected instruction code and an instruction code immediately preceding the detected instruction code as prefix code candidates. When an instruction code of a target instruction code type cannot be detected at the rear end of the plural instruction code units to be searched, the dispatch circuit outputs an instruction code at the rear end as a prefix code candidate. When an instruction code of a target instruction code type is detected at the head in the instruction code search, the dispatch circuit outputs the instruction code at the head.

Effects obtained by the representative ones of the inventions disclosed in the application will be briefly described as follows.

By the means for achieving the first object, while utilizing the advantage of the fixed register using instruction that the number of operands can be assured without extending the instruction code space, further the instruction code space is extended. Even in the case which cannot be handled by the fixed register using instruction, the transfer instruction appearance frequency can be lowered.

By the means for achieving the second object, an instruction with a prefix and an instruction without a prefix can be issued every cycle by instruction types. Efficient superscalar instruction issue in an instruction set including an instruction with a prefix can be realized.

DETAILED DESCRIPTION OF THE PREFERRED EMBODIMENTS

1. Outline of Embodiments

First, outline of representative embodiments of the present invention disclosed in the application will be described Reference numerals in parentheses in the diagrams referred to in the outline explanation of the representative embodiments just illustrate components included in the concept of the components.

(1) A data processor as another aspect of the present invention has an instruction set architecture including a prefix code for modifying a subsequent instruction and performs parallel issue of a plurality of instructions by a superscalar. The data processor has: a decoder (PD0 to PD3) for determining an instruction code type of each of a plurality of instruction codes fetched in parallel; an instruction queue (GIQ0 to GIQ15) for sequentially accumulating a unit made of the plural instruction codes fetched in parallel accompanying a determination result of the decoder; and a dispatch circuit (EX-ISD, LS-ISD, and BR-ISD) for retrieving an instruction code of each instruction code type excluding a prefix code on the unit basis of a plurality of instruction codes output from the instruction queue and outputting an instruction to an instruction decoding and executing unit (EXU) of a corresponding instruction code type on the basis of a retrieval result. When an instruction code of a target instruction code type is detected in the unit of the plural instruction codes to be searched, the dispatch circuit outputs the detected instruction code and an instruction code immediately preceding the detected instruction code as prefix code candidates. When an instruction code of a target instruction code type cannot be detected at the rear end of the unit of the plural instruction codes to be searched, the dispatch circuit outputs an instruction code at the rear end as a prefix code candidate. When an instruction code of a target instruction code type is detected at the head in the instruction code search, the dispatch circuit outputs the instruction code at the head.

(2) In the data processor of (1), when an instruction code supplied as a prefix code candidate is not a prefix code, the instruction decoding and executing unit ignores it.

(3) In the data processor of (2), the instruction decoding and executing unit uses the instruction code at the rear end output as a prefix code candidate as a prefix code candidate of an instruction code of a target instruction code type detected at the head in the immediately subsequent instruction code search and supplied.

(4) In the data processor of (1), each of the immediately preceding instruction code and the instruction code at the rear end is a plurality of instruction codes for the reason that a prefix code may be a plurality of instruction codes.

(5) According to another aspect of the invention, there is provided a data processor of an instruction set architecture having a prefix code for modifying a subsequent instruction. The instruction set includes a fixed register using instruction (instructions (6), (7), and (8) in FIG. 8) whose fixed register is implicitly assigned by the instruction. The prefix code (the prefix codes (1) and (2) in FIG. 7) modifies the subsequent instruction so that the subsequent instruction becomes an instruction having the same function as that of the fixed register using instruction and the fixed register is replaced with an operand which is not limited to a fixed register.

(6) In the data processor of (5), the prefix code is arranged before the fixed register using instruction and modifies the fixed register using instruction so as to replace the fixed register with another register which can be assigned by an instruction.

(7) In the data processor of (5), the prefix code is arranged before the fixed register using instruction and modifies the fixed register using instruction so as to replace the fixed register with an intermediate value.

(8) In the data processor of (5), the prefix code is arranged before a register using instruction whose register can be assigned by the instruction having the same function as that of the fixed register using instruction but whose operand size is different from that of the fixed register using instruction, and modifies the same function instruction to convert operand size of the instruction to operand size which is assigned in an operand size assignment field of the prefix code.

(9) In the data processor of (8), the prefix code also performs a modification of extending a literal field of the instruction having the different operand size.

(10) In the data processor of (8), the prefix code also performs a modification of signed or unsigned extending a high-order side of an operand of a size assigned in the assignment field, on the instruction having a different operand size.

(11) In the data processor of (8), the data processor is a data processor of an instruction set architecture comprising a prefix code for modifying a subsequent instruction, and definition of the prefix code changes according to type of a subsequent instruction to be modified by the prefix code.

(12) In the data processor of (11), when the subsequent instruction is a fixed register using instruction whose register is assigned implicitly by an instruction, the prefix code modifies the fixed register using instruction so as to replace the fixed register with an immediate value. When the subsequent instruction is not a fixed register using instruction whose register is assigned implicitly by an instruction, the prefix code modifies the subsequent instruction so as to change operand size or extend a literal.

2. Details of Embodiments

The embodiments will be described in more details. The forms for carrying out the present invention will be described in detail below with reference to the drawings. In all of the drawings for explaining the forms for carrying out the invention, the same reference numerals are designated to components having the same function and repetitive description will not be given.

First Embodiment

Figure 1:
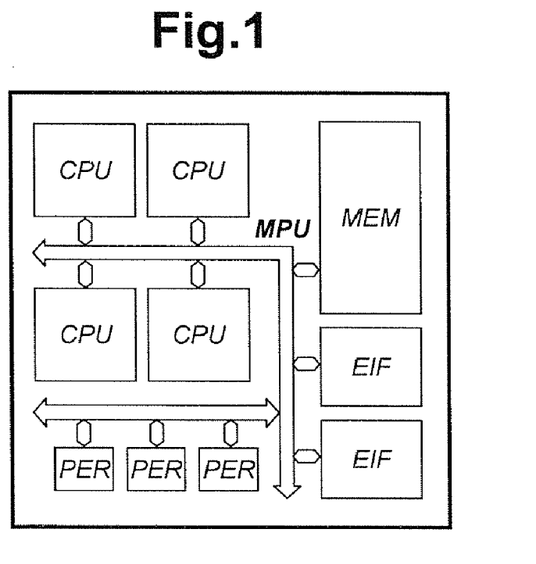
FIG. 1 is a block diagram illustrating a schematic configuration of a data processor according to the present invention.

FIG. 1 illustrates a data processor MPU according to the present invention. The data processor MPU has mainly a plurality of processor cores CPU and, in addition, a memory MEM, external interface circuits EIF, built-in peripheral modules PER, and the like which are coupled via an internal bus. The data processor MPU is, although not limited, formed on a single semiconductor substrate made of single-crystal silicon or the like by the complementary MOS integrated circuit manufacturing technique or the like.

Figure 2:
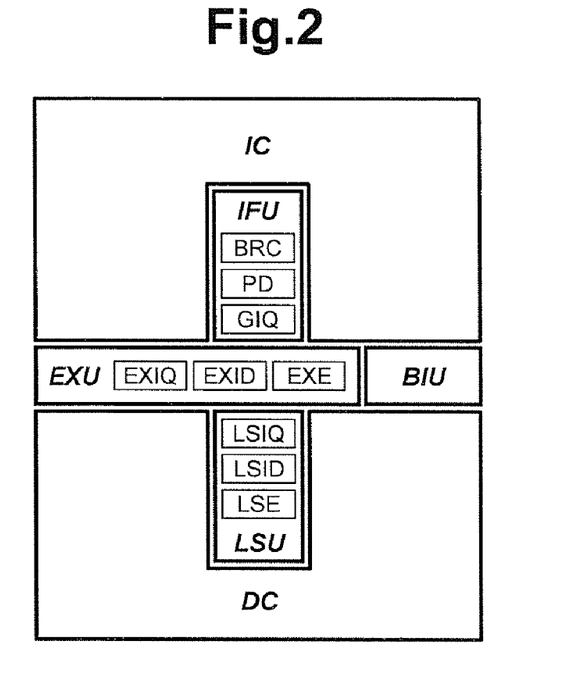
FIG. 2 is a block diagram schematically illustrating a configuration of a processor core in the data processor in the invention.

FIG. 2 schematically illustrates a block configuration of the processor core CPU in the embodiment of the present invention. Near an instruction cache IC, an instruction fetch unit IFU is arranged. The instruction fetch unit IFU includes a pre-decoder PD, a global instruction queue GIQ, and a branch control unit BRC. Near a data cache DC, a load-store unit LSU is arranged. The load-store unit LSU includes a load-store instruction queue LSIQ that holds a load-store instruction, a load-store instruction decoder LSID, and a load-store instruction execution unit LSE. Further, an execution unit EXU includes an execution instruction queue EXIQ for holding an execution instruction, an execution instruction decoder EXID, and an execution instruction execution unit EXE. A bus interface unit BIU is an interface between the processor core and a bus on the outside of the core.

Figure 3:
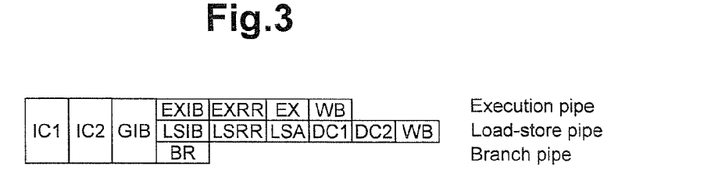
FIG. 3 is an explanatory diagram schematically illustrating a pipeline structure of the processor core in the invention.

FIG. 3 schematically illustrates the pipeline configuration of the processor in the embodiment of the invention. First, there are instruction cache access stages IC1 and IC2 and a global instruction buffer stage GIB common to all of instructions. There are a local instruction buffer EXIB, a local register read stage EXRR, an execution stage EX, and a register write back stage WB for execution instructions. For load-store instructions, there are a local instruction buffer stage LSIB, a local register read stage LSRR, an address calculation stage LSA, data cache access stages DC1 and DC2, and a register write back stage WB. Further, for a branch instruction, there is a branch stage BR.

In the instruction cache access stages IC1 and IC2, the instruction fetch unit IFU fetches an instruction code from the instruction cache stage 1C, the instruction code is decoded by the pre-decoder PD. After that, the pre-decoded instruction code is stored in the global instruction queue GIQ in the global instruction buffer stage GIB. In the global instruction buffer stage GIB, one instruction is extracted from each of categories of load-store, execution, and branch and dispatched. In the local instruction buffer stages LSIB and EXIB and the branch stage BR, the instructions are stored in the instruction queue LSIQ of the load-store unit LSU, the instruction queue EXIQ of the execution unit EXU, and the branch control unit BRC in the instruction fetch unit IFU. In the branch stage BR, in the case where the branch instruction is received, the branching process starts immediately.

In the pipeline for an execution instruction, the execution unit EXU receives one execution instruction at the maximum per cycle in the instruction queue EXIQ in the local instruction buffer stage EXIB. The execution instruction decoder EXID decodes one execution instruction at the maximum. At the following local register read stage EXRR, the register is read. At the execution EX stage, execution operation is performed by using the execution instruction. At the register write back stage WB, if the instruction is to be written in the register, the process result is stored in the register.

In the pipeline for the load-store instruction, the load-store unit LSU receives one instruction at the maximum per cycle in the instruction queue LSIQ at the local instruction buffer stage LSIB. One load-store instruction at the maximum is decoded in the load-store instruction decoder LSID. At the following local register read stage LSRR, the register is read. At the address calculation stage LSA, a load-store address is calculated. At the data cache access stages DC1 and DC2, the load-store process is performed. At the register write back stage WB, if the instruction is to be written in the register, the process result is stored in the register.

Figure 4:
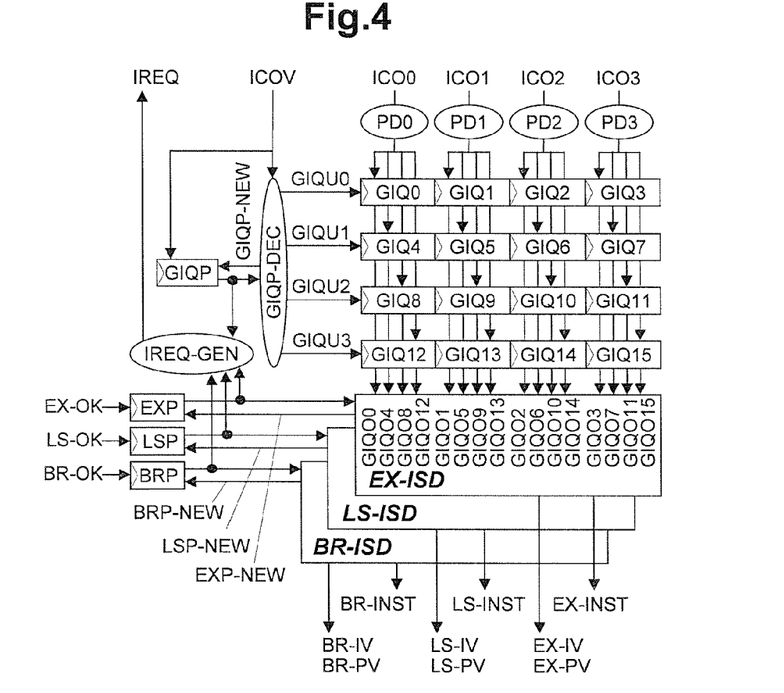
FIG. 4 is a block diagram schematically illustrating the structure of a global instruction queue of the processor core in the invention.

FIG. 4 illustrates the structure of the global instruction queue GIQ of the processor according to the embodiment of the invention. In the example of FIG. 4, the global instruction queue GIQ includes instruction pre-decoders PD0 to PD3 for four instructions, instruction queue entries GIQ0 to GIQ15 for 16 instructions, a global instruction queue pointer GIQP for designating a write position, a global instruction queue pointer decoder GIQP-DEC for decoding the global instruction queue pointer GIQP, an execution instruction pointer EXP which is advances with progress of the instructions in the categories of execution, load and store, and branch and designates a read position, a load-store instruction pointer LSP, a branch instruction pointer BRP, an execution instruction retrieve and dispatch circuit EX-ISD, a load-store instruction retrieve and dispatch circuit LS-ISD, and a branch instruction search and dispatch circuit BR-ISD for retrieving and dispatching an execution instruction, a load-store instruction, and a branch instruction in accordance with the pointers, respectively, and an instruction fetch request generating unit IREQ-GEN.

In the global instruction queue GIQ, from a global instruction queue pointer GIQP and an instruction cash output valid signal ICOV, according to global instruction queue update signals GIQU0 to GIQU3 generated by the global instruction queue pointer decoder GIQP-DEC, four instruction codes ICO0 to ICO3 fetched from the instruction cache IC are latched in global instruction queue entry groups GIQ0 to GIQ3, GIQ4 to GIQ7, GIQ8 to GIQ11, or GIQ12 to GIQ15. In the case where the instruction cache output valid signal ICOV is asserted, the global instruction queue update signals GIQU0 to GIQU3 assert an update signal for an instruction queue entry group pointed by the global instruction queue pointer GIQP. In the case where the instruction cache output valid signal ICOV is asserted and the fetched instruction codes ICO0 to ICO3 are latched in the global instruction queue GIQ, the global instruction queue pointer GIQP is updated. For this purpose, a value obtained by adding one to the global instruction queue pointer GIQP is output as a new global instruction cache pointer GIQP-NEW in advance and, when the instruction cache output valid signal ICOV is asserted, the global instruction queue pointer GIQP is updated with the value.

The execution instruction retrieve and dispatch circuit EX-ISD enters four instruction codes starting from the instruction code, as the head, pointed by the execution instruction pointer EXP from the global instruction queue outputs GIQO0 to GIQO15 as outputs of the global instruction queue entries GIQ0 to GIQ15 and searches for an execution instruction code. In the case where there is an execution instruction code in an instruction other than the head code, an execution instruction code valid signal EX-IV is asserted, the execution instruction code and its immediately preceding instruction code are selected and output as an execution instruction EX-INST. When the immediately preceding instruction code is selected, if it is a prefix code, the prefix code and an instruction code modified by the prefix code can be out put together. At this time, an execution prefix candidate valid signal EX-PV is asserted. In the case where the execution instruction code valid signal EX-IV is asserted and the execution prefix candidate validate signal EX-PV is asserted, the execution unit EXU determines that an instruction supplied immediately before the execution instruction code, that is, a prefix code candidate is a prefix code. In the other case, the execution unit EXU ignores the instruction. If the instruction is a prefix code, the execution unit EXU modifies an immediately subsequent execution instruction and executes it.

When an execution instruction cannot be detected at the rear end of the four instructions to be searched, the execution instruction retrieve and dispatch circuit EX-ISD asserts the execution prefix candidate valid signal EX-PV, negates the execution instruction code valid signal EX-IV, and outputs the instruction at the rear end as a prefix code candidate to the execution unit EXU. When the execution prefix candidate valid signal EX-PV is asserted and the execution instruction code valid signal EX-IV is negated, the execution unit EXU receives the instruction at the rear end as a prefix code candidate supplied at that time and waits to process it until the next cycle.

In the case where an execution instruction code is found at the head of the four instructions to be searched, the execution instruction retrieve and dispatch circuit EX-ISD negates the execution prefix candidate valid signal EX-PV, asserts the execution instruction code valid signal EX-IV, and outputs the execution instruction code to the execution unit EXU. In the case where the execution unit EXU preliminarily receives the instruction at the rear end as an execution prefix candidate at the end of the immediately preceding searching process by the negation of the execution prefix candidate valid signal EX-PV and the assertion of the execution instruction code valid signal EX-IV, the execution unit EXU determines that the instruction at the rear end is a prefix code. In the other case, the execution unit EXU ignores the instruction. If the instruction is a prefix code, the execution instruction received this time is modified with the prefix code and is executed.

An invalid instruction is included in the four instructions to be searched in the case where a range including a group of an invalid instruction code out of the global instruction queue entry groups GIQ0 to GIQ3, GIQ4 to GIQ7, GIQ8 to GIQ11, and GIQ12 to GIQ15 becomes an object to be searched.

As a result of the control, when both of the execution instruction code valid signal EX-IV and the execution prefix candidate valid signal EX-PV are asserted, the execution instruction code and also the immediately preceding execution prefix candidate are output. When the execution instruction code valid signal EX-IV is negated and the execution prefix candidate valid signal EX-PV is asserted, a non-execution-instruction at the rear end is output as an execution prefix candidate in advance. When the execution instruction code valid signal EX-IV is asserted and the execution prefix candidate valid signal EX-PV is negated, only the execution instruction code at the head is output and used together with the execution prefix candidate which was output in advance. When the execution instruction code valid signal EX-IV is negated and the execution prefix candidate valid signal EX-PV is also negated, no instruction code is output. In the case where the code decoded as the execution prefix candidate is not an execution prefix, only the execution instruction code is used, and the instruction is executed.

Similarly, the load-store instruction retrieve and dispatch circuit LS-ISD also outputs a load-store instruction code valid signal LS-IV, a load-store instruction IS-INST, a load-store prefix candidate valid signal LS-PV, and a new load store instruction pointer LSP-NEW from the global instruction queue outputs GIQO0 to GIQO15 in accordance with the load-store instruction pointer LSP. The branch instruction retrieve and dispatch circuit BR-ISD also outputs a branch instruction code valid signal BR-IV, a branch instruction BR-INST, a branch prefix candidate valid signal BR-PV, and a new branch instruction pointer BRP-NEW from the global instruction queue outputs GIQO0 to GIQO15 in accordance with the branch instruction pointer BRP.

The instruction fetch request generating unit IREQ-GEN determines whether or not there is vacancy of one entry group or more in the global instruction queue entry groups GIQ0 to GIQ3, GIQ4 to GIQ7, GIQ8 to GIQ11, and GIQ12 to GIQ15 on the basis of the values of the pointers GIQP, EXP, LSP, and BRP. When there is vacancy, the instruction fetch request signal IREQ is asserted. The no-vacancy state corresponds to a state where the a global instruction queue entry group for latching the instruction codes ICO0 to ICO3 fetched next, which is pointed by the global instruction queue pointer GIQP is not pointed by the pointers EXP, LSP, and BRP. By generating an instruction fetch request signal IREQ from the new pointers GIQP-NEW, EXP-NEW, LSP-NEW, and BRP-NEW in place of the pointers, the instruction cache output valid signal ICOV as an update signal of the global instruction queue pointer GIQP, and update control signals EX-OK, LS-OK, and BR-OK of the pointers, the instruction fetch request signal IREQ can be generated earlier by one cycle. Depending on a signal timing of the instruction cache IC that receives the instruction fetch request signal IREQ, methods of various timings such as the method of generating a signal from a pointer, a method of generating a signal from a new pointer, and a method of generating a signal, latching it, and transmitting it to the instruction cache IC can be considered.

Figure 5:
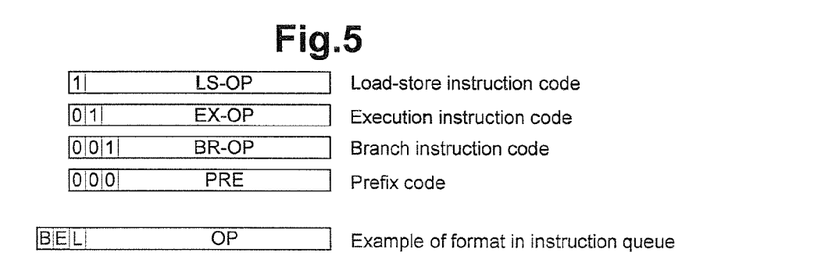
FIG. 5 is an explanatory diagram schematically illustrating an instruction code format including a prefix code of the processor core in the invention.

FIG. 5 illustrates an instruction code format including a prefix code. Since the case where the number of instruction codes varies according to the instruction type is common, in the example, it is assumed that the load-store instruction code uses the half of the entire instruction code space, and the execution instruction code is the half of the rest. Further, each of the branch instruction code and the prefix code uses the half of the rest. When the most significant bit of a 16-bit fixed-length instruction code is 1, the code is the load-store instruction code. When the upper two bits are 01, the code is the execution instruction code. When the upper three bits are 001, the code is the branch instruction code. When the upper three bits are 000, the code is the prefix code. By the instruction pre-decoders PD0 to PD3 in the global instruction queue GIQ illustrated in FIG. 4, the upper three bits of the 16-bit fixed-length instruction code are decoded to determine the instruction code type which is any of the load-store instruction, the execution instruction, the branch instruction, or the prefix instruction. A branch instruction bit B which is asserted when the instruction type is the branch instruction and an execution instruction bit E which is asserted when the instruction type is the execution instruction are added. The most significant bit of the 16-bit fixed-length instruction code can be used as it is as the load-store instruction bit L. As a result, instruction search of the execution instruction retrieve and dispatch circuit EX-ISD, the load-store instruction retrieve and dispatch circuit LS-ISD, and the branch instruction retrieve and dispatch circuit BR-ISD is facilitated.

Figure 6:
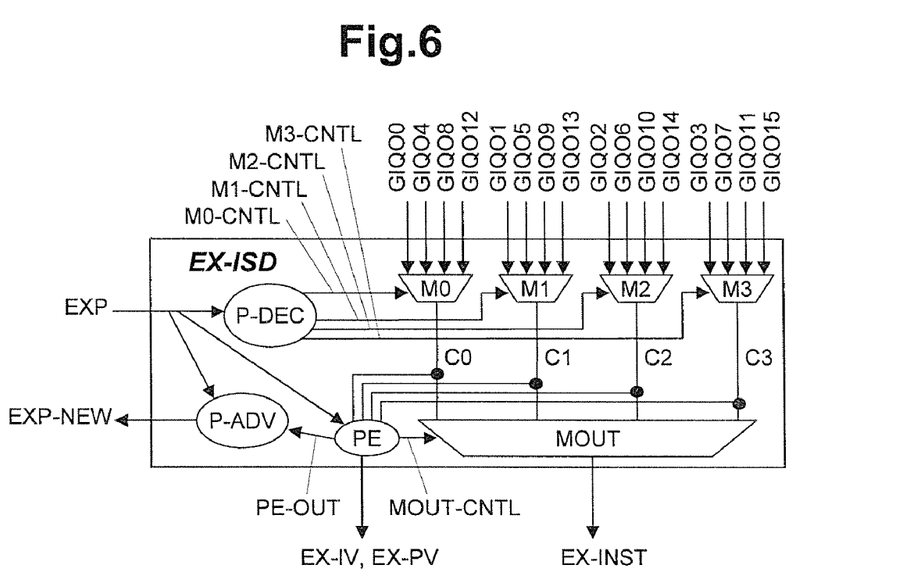
FIG. 6 is a block diagram schematically illustrating the structure of an instruction search dispatch circuit of a global instruction queue in the processor core in the invention.

FIG. 6 illustrates the structure of the execution instruction retrieve and dispatch circuit EX-ISD in the global instruction queue GIQ shown in FIG. 4. The execution instruction retrieve and dispatch circuit EX-ISD includes a pointer decoder P-DEC, instruction code multiplexers M0 to M3, a priority encoder PE, an output instruction code multiplexer MOUT, and a pointer update circuit P-ADV. The pointer decoder P-DEC decodes the execution instruction pointer EXP and generates control signals M0-CNTL to M3-CNTL for the instruction code multiplexers M0 to M3 so that four instruction codes starting from an instruction code pointed by the execution instruction pointer EXP are selected. The instruction code multiplexer M0 selects one instruction code from GIQO0, GIQO4, GIQO8, and GIQO12 in accordance with the control signal M0-CNTL and outputs it as an instruction code C0 to be retrieved. The instruction code multiplexer M1 selects one instruction code from GIQO1, GIQO5, GIQO9, and GIQO13 in accordance with the control signal ML-CNTL and outputs it as an instruction code C1 to be retrieved. The instruction code multiplexer M2 selects one instruction code from GIQO2, GIQO6, GIQO10, and GIQO14 in accordance with the control signal M2-CNTL and outputs it as an instruction code C2 to be retrieved. The instruction code multiplexer M3 selects one instruction code from GIQO3, GIQO7, GIQO11, and GIQO15 in accordance with the control signal M3-CNTL and outputs it as an instruction code C3 to be retrieved. As a result, a fixed order is not given but an instruction order is given cyclically from the head instruction code to the instruction codes C0 to C3 to be retrieved. The priority encoder PE starts a search from the head instruction code pointed by the execution instruction pointer EXP on the execution instruction bits E of the instruction codes C0 to C3 to be retrieved by priority encoding to retrieve an execution instruction code. The details of the output controls such as the execution instruction EX-INST by the search are as described above.

The above description is based on the precondition that all of instructions entered in a four-instruction unit to the execution instruction retrieve and dispatch circuit EX-ISD are valid instructions in the global instruction queue GIQ. The case where an invalid instruction, for example, an instruction which is already read before it is fetched is included in the global instruction queue GIQ will be assumed. In this case, the execution instruction retrieve and dispatch circuit EX-ISD performs the following control. For example, an output instruction code multiplexer control signal MOUT-CNTL is output so that, when the execution code search is performed on four instructions and an instruction code is found, the instruction code is selected. In the case where no instruction code is found, when all of the searched four instructions are valid, the instruction code at the rear end is selected. When an invalid instruction is included in the four instructions, the first invalid instruction code is selected and, further, the instruction code immediately preceding the selected instruction code is also selected. Since the order of the instruction codes C0 to C3 to be searched is cyclic, if the instruction code is selected in the case where no instruction code is found, the last valid instruction code is selected as the immediately preceding instruction code. Even if the selected code is the prefix for an execution instruction, the instruction code is properly selected and output. The selecting control is the same as that in the case where the execution instruction code is found, so that it is simple. In a manner similar to the above description, when a new instruction to be retrieved is selected and the head instruction code is an execution instruction, the execution prefix candidate valid signal EX-PV is negated and an instruction is given to use an execution prefix candidate already stored in the execution unit without using an execution prefix candidate which is output at the same time as a part of the execution instruction code EX-INST.

The load-store instruction retrieve and dispatch circuit LS-ISD and the branch instruction retrieve and dispatch circuit BR-ISD are also configured in a manner similar to the execution instruction retrieve and dispatch circuit EX-ISD.

By the above-described control, the second object is achieved. In each of the instruction types, an instruction with a prefix and an instruction without a prefix can be issued every cycle. Efficient superscalar instruction issue in an instruction set including an instruction with a prefix can be realized. By changing the number of an immediately preceding instruction code to be added to a found instruction code from one to two or more, the control method can be applied also to an instruction set architecture permitting a plurality of prefix codes. Thus, efficient superscalar instruction issue can be realized.

Second Embodiment

Figure 7:
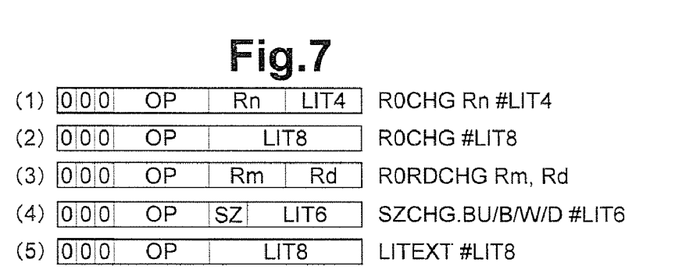
FIG. 7 is an explanatory diagram schematically illustrating definition of a prefix code of the processor core in the invention.
Figure 8:
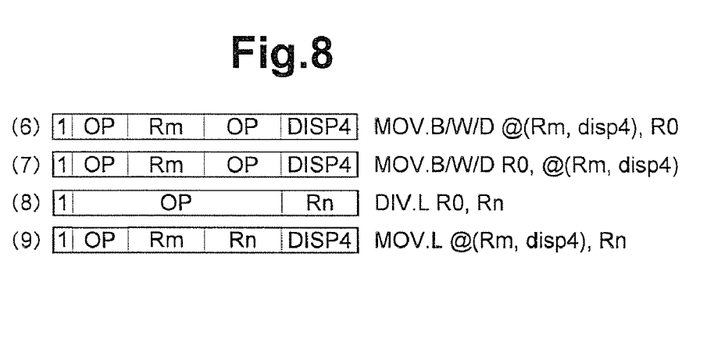
FIG. 8 is an explanatory diagram schematically illustrating an instruction modified by a prefix code of the processor core in the invention.

FIG. 7 illustrates a prefix code definition for achieving the first object of the present invention. FIG. 8 illustrates instructions to be modified by prefix codes.

The code R0CHG Rn, #LIT4 of (1) in FIG. 7 is a prefix code for replacing a fixed register of a fixed register using instruction with another register and extending a literal by four bits. The state where the upper three bits are 000 denotes that the code is a prefix code as shown in FIG. 5. The code has a register field Rn for designating a register to be replaced. Rn is a 4-bit field and can designate one of general registers 0 to 15. OP denotes an operation code indicative of the kind of a prefix. The case of applying the code to the instruction (6) of FIG. 8 will be considered. The instruction MOV. B/W/D @ (Rm, DISP4), R0 of (6) is a load instruction in which a register Rm is set as a base address, a value obtained by adding 4-bit displacement DISP4 to the register Rm is used as a memory access address, and a value having bytes B, word (16 bits) W, or a double long (64 bits) D size is stored in R0. By modifying the instruction with the prefix code (1), R0 can be changed to Rn, the 4-bit displacement DISP4 can be extended by four bits to eight bits, and the instruction can be converted to an instruction MOV. B/W/D @ (Rm, DISP8), Rn which does not use the register R0. The general versatility of register assignment increases, in addition, the displacement is extended to DISP8 of eight bits, so that the general versatility of address designation increases. There are no transfer to R0 and reading of R0 and improvement in performance and reduction in power is achieved.

The code R0CHG #LIT8 of (2) in FIG. 7 is a prefix code for replacing a fixed register of a fixed register using instruction with an immediate, and has a literal field LIT8 for designating the immediate. The case of applying the code to the instruction (7) of FIG. 8 will be considered. The instruction MOV. B/W/D R0, @ (Rm, DISP4) of (7) is a store instruction in which a register Rm is set as a base address, a value obtained by adding 4-bit displacement DISP4 to the register Rm is used as a memory access address, and a value of low one byte, low one word, or a double long size is stored in the address. By modifying the instruction with the prefix code (2), the register R0 can be changed to a literal, and the instruction can be converted to an instruction MOV. B/W/D #LIT8, @ (Rm, DISP4) which does not use the register R0. In a manner similar to the code (1), the general versatility of register assignment increases and, in addition, improvement in performance and reduction in power is achieved.

The code R0RDCHG Rm, Rd of (2) in FIG. 7 is a prefix code for replacing a fixed register of a fixed register using instruction to Rm, converting a modify operand to a read operand, and newly adding a destination operand Rd, and has register fields Rm and Rd for designating a replacing register and a register to be added. The case of applying the code to the instruction (8) of FIG. 8 will be considered. The instruction DIV.L R0, Rn (8) is a division instruction in which the value of the register Rn is divided by the value of the register R0, and the result is stored in the register Rn. By modifying the instruction with the prefix code (3) in FIG. 7, the register R0 can be changed to a register Rm, further, the destination can be changed to a register Rd, and a 3-operand instruction DIV.L Rm, Rn, Rd which does not use R0 for dividing the value of the register Rn by the value of the register Rm and storing the result to the register Rd is obtained. The general versatility of register assignment increases and, in addition, improvement in performance and reduction in power is achieved.

The code SZCHG. BU/B/W/D #LIT6 of (4) in FIG. 7 is a prefix code for converting the data size of an instruction having data size long (32 bits) L to the byte B, word W, or double long D and extending the literal by six bits. In conversion to the byte size, signed or unsigned extension to a higher-order bit on a register of byte-size data can be selected. For the unsigned extension, BU is designated. For the signed extension, B is designated. The four ways are designated in the size field SZ of two bits. The code also has a literal field LIT6 for literal extension. The case of applying the code to the instruction (9) of FIG. 8 will be considered. The instruction MOV. L @ (Rm, DISP4), Rn of (9) is a load instruction in which the register Rm is set as a base address, a value obtained by adding 4-bit displacement DISP4 to the register Rm is used as a memory access address, and a value having a long size loaded from the address is stored into Rn. By modifying the instruction with the prefix code of (4) in FIG. 7, the data size can be changed to BU, B, W, or D, and the instruction is converted to an instruction MOV. BU/B/W/D @ (Rm, DISP10), Rn. The general versatility of data size increases, the displacement is extended to DISP10 of ten bits, and improvement in performance and reduction in power is achieved. A 16-bit fixed-length instruction of another size corresponding to the instruction MOV. L @ (Rm, DISP4), Rn of (9) in FIG. 8 is the instruction MOV. B/W/D @ (Rm, DISP4), R0 of (6) in FIG. 8. By applying the prefix code R0CHG Rn, #LIT4 of (1) in FIG. 7, the constraint on the fixed register R0 can be removed. However, since extension of the displacement is small as four bits, the effect is smaller than the prefix code of (4) in FIG. 7.

The code R0CHG Rn, #LIT4 of (1) in FIG. 7 is meaningful only when it is applied to an instruction having the fixed operand R0. On the other hand, the code SZCHG. BU/B/W/D #LIT6 of (4) in FIG. 7 is meaningful only when applied to an instruction having no fixed operand R0 and having high general versatility. Therefore, even by assigning the same instruction code OP to the two prefix codes, it can be properly used according to the subsequent instruction to be modified. By leaving the additional information, positioning, and interpretation of the instruction subsequent to the prefix code to the subsequent instruction to be modified, the kinds of instruction codes OP of the prefix codes is decreased, and the prefix code space can be reduced. In the example of FIG. 7, five bits are assigned to the instruction code OP and 32 kinds can be defined. However, it is considered that so many prefix codes are unnecessary. For example, when it is determined that upper six bits of a prefix are 0, the prefix code space can be reduced. In the case of an 8-bit operand, four kinds can be defined. On the contrary, there is also an option that the operand is increased to have more than eight bits without changing the definition that upper three bits of a prefix are 0.

The code LITEXT #LIT8 of (5) in FIG. 7 is a prefix code for extending a literal of an instruction by eight bits. The code is applied to both of an instruction having the fixed operand R0 and an instruction having no fixed operand R0. In both of the cases, the meaning of the prefix code is the same.

By the prefix code definition as described above, while utilizing the advantage of the fixed register using instruction that the number of operands can be assured without extending the instruction code space, the instruction code space is further extended. Even in the case which cannot be handled by the fixed register using instruction, the transfer instruction appearance frequency can be reduced. In addition, by extending displacement, an address which cannot be reached in the case of using no prefix can be reached. The case of using two instructions of an immediate value transfer instruction for displacement setting and an index relative load instruction in order to handle the case where the address is not reached is reduced, so that the transfer instruction appearance frequency is lowered.

Although the invention achieved by the inventors herein has been concretely described on the basis of the embodiments, obviously, the invention is not limited to the embodiments but can be variously changed without departing from the gist.

For example, the number of parallel pipelines is not limited to three as shown in FIG. 3, the unit of an instruction fetch is not limited to four instructions in parallel, and the global instruction queue entry is not limited to 16 four-entry groups in FIG. 4. The instruction in the instruction set is not limited to have an instruction length of mainly 16 bits.

What is claimed is:

1. A data processor which comprises an instruction set architecture comprising instructions each of which has an instruction code being of one of plurality of instruction code types of being a prefix code for modifying a subsequent instruction, and performs parallel issue of a plurality of instructions, the data processor comprising:
    a decoder for determining an instruction code type of each of instruction codes fetched in parallel;
    an instruction queue for sequentially accumulating sets of the instruction codes fetched in parallel, with each instruction code being accompanied by an indication of the instruction code type determined by the decoder; and
    a dispatch circuit for searching an instruction code of each instruction code type excluding a prefix code from a plurality of instruction codes accumulated by the instruction queue and outputting the instruction code of the searched instruction code type to an instruction decoding and executing unit corresponding to the searched instruction code type,
    wherein when an instruction code of a target instruction code type is detected other than at a head of instruction codes being searched, the dispatch circuit outputs the detected instruction code and an instruction code immediately preceding the detected instruction code as a prefix code candidate,
    wherein when an instruction code of a target instruction code type is not detected at a rear end of the instruction codes being searched, the dispatch circuit outputs an instruction code at the rear end of the instruction codes being searched as a prefix code candidate, and
    wherein when an instruction code of a target instruction code type is detected at the head of the instruction codes being searched, the dispatch circuit outputs the instruction code at the head.

2. The data processor according to claim 1, wherein when an instruction code supplied as a prefix code candidate is not a prefix code, the instruction decoding and executing unit ignores it.

3. The data processor according to claim 2, wherein the instruction decoding and executing unit uses the instruction code at the rear end output as a prefix code candidate as a prefix code candidate of an instruction code of a target instruction code type detected at the head in an immediately subsequent instruction code search.

4. The data processor according to claim 1, wherein each of the immediately preceding instruction code and the instruction code at the rear end can be a plurality of instruction codes.

* * * * *